US008005889B1

(12) United States Patent
Issa et al.

(10) Patent No.: US 8,005,889 B1
(45) Date of Patent: Aug. 23, 2011

(54) SYSTEMS, METHODS, AND COMPUTER PROGRAM PRODUCTS FOR SYNCHRONIZING FILES IN A PHOTOSHARING PEER-TO-PEER NETWORK

(75) Inventors: Alfredo Celino Issa, Apex, NC (US); Gary Whitson Black, Cary, NC (US); Patricia Ann Scardino, Apex, NC (US); Christopher Michael Amidon, Apex, NC (US); Hugh Blake Svendsen, Chapel Hill, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 954 days.

(21) Appl. No.: 11/280,160

(22) Filed: Nov. 16, 2005

(51) Int. Cl.
*G06F 15/16* (2006.01)
(52) U.S. Cl. ........................................ 709/201; 709/217
(58) Field of Classification Search .................. None
See application file for complete search history.

(56) References Cited

U.S. PATENT DOCUMENTS

| | | | |
|---|---|---|---|
| 5,414,455 A | 5/1995 | Hooper et al. | |
| 5,915,252 A | 6/1999 | Misheski et al. | |
| 5,918,013 A | 6/1999 | Mighdoll et al. | |
| 6,073,168 A * | 6/2000 | Mighdoll et al. | 709/217 |
| 6,292,835 B1 | 9/2001 | Huang et al. | |
| 6,330,606 B1 | 12/2001 | Logue et al. | |
| 6,349,336 B1 | 2/2002 | Sit et al. | |
| 6,449,657 B2 | 9/2002 | Stanbach, Jr. et al. | |
| 6,463,508 B1 | 10/2002 | Wolf et al. | |
| 6,487,538 B1 | 11/2002 | Gupta et al. | |
| 6,490,615 B1 | 12/2002 | Dias et al. | |
| 6,564,218 B1 | 5/2003 | Roth | |
| 6,622,168 B1 | 9/2003 | Datta | |
| 6,631,369 B1 * | 10/2003 | Meyerzon et al. | 707/4 |
| 6,633,850 B1 | 10/2003 | Gabbard et al. | |

(Continued)

FOREIGN PATENT DOCUMENTS

WO   2005/099165 A2   10/2005

(Continued)

OTHER PUBLICATIONS

Jason Parker, "An Easy Way to Share Digital Photos with Others," (article), Jun. 13, 2003, 1 page, ZDNet AnchorDesk Editorial Feature, http://reviews-zdnet.com.

(Continued)

*Primary Examiner* — Krista M Zele
*Assistant Examiner* — Matthew S Lindsey
(74) *Attorney, Agent, or Firm* — Withrow & Terranova, PLLC

(57) ABSTRACT

Systems, methods, and computer program products for synchronizing digital photo albums at peer servers with a proxy server and a guest content server in a photosharing peer-to-peer network are provided such that the proxy server and guest content server can serve content to requesters from photo albums of an off-line peer server. A synchronization manager receives a request from a peer server to synchronize image files of one or more photo albums at the peer server with image files cached on the proxy server. The synchronization manager directs a web robot to crawl the URL of each photo album identified in the request and to identify image files at the peer server that have been modified and/or that are not currently cached on the proxy server. The web robot also identifies non-image files associated with each image file. The web robot retrieves and caches identified image files on the proxy server. The web robot retrieves and caches identified non-image files on the guest content server.

24 Claims, 8 Drawing Sheets

U.S. PATENT DOCUMENTS

| | | | |
|---|---|---|---|
| 6,651,141 | B2 | 11/2003 | Adrangi |
| 6,658,463 | B1 | 12/2003 | Dillon et al. |
| 6,754,699 | B2 | 6/2004 | Swildens et al. |
| 6,757,684 | B2 | 6/2004 | Svendsen et al. |
| 6,757,705 | B1 * | 6/2004 | Pardikar et al. ............... 709/203 |
| 6,917,965 | B2 | 7/2005 | Gupta et al. |
| 6,925,485 | B1 | 8/2005 | Wang et al. |
| 6,934,735 | B1 * | 8/2005 | Emens et al. ................. 709/203 |
| 6,954,752 | B2 | 10/2005 | Iyengar |
| 7,027,513 | B2 | 4/2006 | Zhang et al. |
| 7,039,784 | B1 | 5/2006 | Chen et al. |
| 7,043,644 | B2 | 5/2006 | DeBruine |
| 7,272,645 | B2 | 9/2007 | Chang et al. |
| 2002/0023143 | A1 | 2/2002 | Stephenson et al. |
| 2002/0023230 | A1 | 2/2002 | Bolnick et al. |
| 2002/0046262 | A1 | 4/2002 | Heilig et al. |
| 2002/0062384 | A1 | 5/2002 | Tso |
| 2002/0078134 | A1 | 6/2002 | Stone et al. |
| 2002/0103998 | A1 | 8/2002 | DeBruine |
| 2002/0107934 | A1 | 8/2002 | Lowery et al. |
| 2002/0133601 | A1 | 9/2002 | Kennamer et al. |
| 2002/0138744 | A1 | 9/2002 | Schleicher et al. |
| 2002/0178261 | A1 | 11/2002 | Chang et al. |
| 2003/0005035 | A1 | 1/2003 | Rodgers |
| 2003/0009538 | A1 | 1/2003 | Shah et al. |
| 2003/0018639 | A1 | 1/2003 | Iyengar |
| 2003/0050863 | A1 | 3/2003 | Radwin |
| 2003/0061272 | A1 | 3/2003 | Krishnamurthy et al. |
| 2003/0063770 | A1 | 4/2003 | Svendsen et al. |
| 2003/0063771 | A1 | 4/2003 | Morris et al. |
| 2003/0069968 | A1 | 4/2003 | O'Neil et al. |
| 2003/0084162 | A1 | 5/2003 | Johnson et al. |
| 2003/0105812 | A1 | 6/2003 | Flowers, Jr. et al. |
| 2003/0112823 | A1 | 6/2003 | Collins et al. |
| 2003/0154306 | A1 | 8/2003 | Perry |
| 2003/0191832 | A1 | 10/2003 | Satyavolu et al. |
| 2003/0225885 | A1 | 12/2003 | Rochberger et al. |
| 2004/0054860 | A1 | 3/2004 | Dixit et al. |
| 2004/0064512 | A1 | 4/2004 | Arora et al. |
| 2004/0064568 | A1 | 4/2004 | Arora et al. |
| 2004/0064693 | A1 | 4/2004 | Pabla et al. |
| 2004/0070678 | A1 * | 4/2004 | Toyama et al. ............ 348/231.3 |
| 2004/0088348 | A1 | 5/2004 | Yeager et al. |
| 2004/0098447 | A1 | 5/2004 | Verbeke et al. |
| 2004/0139172 | A1 | 7/2004 | Svendsen et al. |
| 2004/0139227 | A1 | 7/2004 | Takeda |
| 2004/0148434 | A1 | 7/2004 | Matsubara et al. |
| 2004/0162871 | A1 | 8/2004 | Pabla et al. |
| 2004/0215625 | A1 | 10/2004 | Svendsen et al. |
| 2005/0066063 | A1 | 3/2005 | Grigorovitch et al. |
| 2005/0071496 | A1 | 3/2005 | Singal et al. |
| 2005/0086386 | A1 | 4/2005 | Shen et al. |
| 2005/0091220 | A1 | 4/2005 | Klemow et al. |
| 2005/0097085 | A1 | 5/2005 | Shen et al. |
| 2005/0114711 | A1 * | 5/2005 | Hesselink et al. ............ 713/201 |
| 2005/0114757 | A1 | 5/2005 | Sahota et al. |
| 2005/0138176 | A1 | 6/2005 | Singh et al. |
| 2005/0147044 | A1 | 7/2005 | Teodosiu et al. |
| 2005/0160167 | A1 | 7/2005 | Cheng et al. |
| 2005/0193083 | A1 | 9/2005 | Han et al. |
| 2005/0198191 | A1 | 9/2005 | Carlson et al. |
| 2005/0229243 | A1 | 10/2005 | Svendsen et al. |
| 2005/0267973 | A1 | 12/2005 | Carlson et al. |
| 2006/0010225 | A1 | 1/2006 | Issa |
| 2006/0064716 | A1 | 3/2006 | Sull et al. |
| 2006/0136551 | A1 | 6/2006 | Amidon et al. |
| 2006/0242238 | A1 | 10/2006 | Issa |
| 2007/0064121 | A1 | 3/2007 | Issa et al. |
| 2007/0067493 | A1 | 3/2007 | Issa |
| 2007/0073878 | A1 | 3/2007 | Issa |
| 2007/0078993 | A1 | 4/2007 | Issa |
| 2007/0208583 | A1 | 9/2007 | Ward |
| 2007/0271380 | A1 | 11/2007 | Chang et al. |
| 2008/0178234 | A1 | 7/2008 | Eyal et al. |

FOREIGN PATENT DOCUMENTS

| | | | |
|---|---|---|---|
| WO | 2006/026193 | A2 | 3/2006 |
| WO | 2006/055535 | A2 | 5/2006 |

OTHER PUBLICATIONS

No Author, Wikipedia—Broadcatching, (website), obtained Mar. 5, 2008, 3 pages, http://en.wikipedia.org/wiki/Broadcatching.

Scott Raymond, "Broadcatching with BitTorrent," (article), Dec. 16, 2003, 3 pages, http://web.archive.org/web/20040213093750/http://scottraymond.net/archive/4745.

Reuven M. Lerner, "At the Forge Syndication with RSS," (article), 2004, 9 pages, Linux Journal, vol. 2004, No. 126, 2004.

Reuven M. Lerner, "At the Forge Aggregating with Atom," (article), 2004, 7 pages, Linux Journal, vol. 2004, No. 127, 2004.

Reuven M. Lerner, "At the Forge: Bloglines Web Services," (article), 2005, 6 pages, Linux Journal, vol. 2005, No. 129, 2005.

Reuven M. Lerner, "At the Forge Aggregating Syndication Feeds," (article), 7 pages, 2004, Linux Journal, vol. 2004, No. 128, 2004.

Reuven M. Lerner, "At the Forge Bloglines Web Services, Continued," (article), 2005, 7 pages, Linux Journal, vol. 2005, No. 131, 2005.

No Author, The Apache Software Foundation, (website), obtained May 22, 2006, 2 pages, at http://www.apache.org/.

No Author, Squid Web Proxy Cache, (website), obtained May 22, 2006, 1 page, at http:/www.squid-cache.org/.

Sung-Ju Lee et al., "An Interactive Video Delivery and Caching System Using Video Summarization," (article), Mar. 2002, pp. 424-435, Computer Communications, vol. 25, No. 4.

* cited by examiner

SYSTEMS, METHODS, AND COMPUTER PROGRAM PRODUCTS FOR SYNCHRONIZING FILES IN A PHOTOSHARING PEER-TO-PEER NETWORK

RELATED APPLICATION

This application claims the benefit of and priority to U.S. patent application Ser. No. 10/990,560, filed Nov. 16, 2004 entitled "Serving Content from an Off-Line Peer Server in a Photosharing Peer-To-Peer Network in Response to a Guest Request", the disclosure of which is incorporated herein by reference as if set forth in its entirety.

FIELD OF THE INVENTION

The present invention generally relates to the sharing of digital images over a network, and more particularly to the sharing of digital images stored on peer computers in a photosharing peer-to-peer network.

BACKGROUND OF THE INVENTION

Over the past several years, photosharing has become widely accepted by photo enthusiasts. Many websites currently exist that allow users to upload digital images to the site for storage on a server and for viewing by others over the Internet. Oftentimes, images are grouped to form an album web page so that the user can invite others to view the album web page, as opposed to each individual image.

This approach to photosharing, however, presents some disadvantages. In particular, users are required to upload digital images to a site, which can be time consuming. Moreover, the site may require extensive storage capacity to store the images of all the users, which can become expensive.

To address these concerns, the assignee of the present invention has developed a web-based peer-to-peer (P2P) photosharing system in which all workstations and computers (peers) in the network store images locally and act as servers to other users on the network. A central site accessible by all the peers provides additional functionality, such as coordinating the peers, providing search capabilities for the peers, purchase order fulfillment, etc.

FIG. 1 is a block diagram illustrating a web-based peer-to-peer photosharing system 20. The peer-to-peer photosharing system 20 includes a photosharing P2P network 22, which comprises multiple peer servers 24 running peer node software 26 and web server software 28. The peer node and server software 24 and 26 enables users to share images with others accessing the network 22 via a computer or other device running a client, such as a web browser 30. The photosharing P2P network 22 provides a hybrid peer-to-peer architecture for a general HTTP/web browser configuration that incorporates a central proxy server 36 to coordinate networking traffic for peers behind firewalls, thus allowing access to peers behind firewalls by other peers and by visiting computers 32 not in the network 22. The proxy server 36 provides supporting services to the peers 24 as well as providing a path through which the visiting computer 32 accesses images from the peer servers 24 via a web browser 30.

Each peer 24 stores album web pages and associated images locally in a database. Each photo album web page is associated with a descriptor that includes information about the photo album, such as which images are included in the photo album and who is permitted to see the photo album. For example, if the photo album is private, only the owner is allowed to view the photo album; if the photo album is "public," then everyone can access the photo album; and if the photo album is "restricted," then the photo album is accessible only to selected users. In this case, the descriptor includes an access list. The descriptor for each photo album web page is stored in a database (not shown) in a respective peer 24.

When a peer 24 receives a request (via the proxy server 36) to access a photo album web page from either another peer 24 or a visiting computer 32, the peer 24 accesses its database to retrieve the descriptor associated with the requested photo album web page. From the descriptor, the peer 24 determines whether the requestor (e.g., peer user or user of the visiting computer) is permitted to access the photo album and determines which images are in the photo album web page. If the access is authorized, the peer 24 returns the photo album web page, which contains embedded images representing each of the photo album images.

Upon receipt of a photo album web page, the requestor's browser 30 interprets the web page and then initiates separate requests for each embedded image therein. When the peer 24 receives the request for the image, it accesses the database again to retrieve the descriptor for the photo album page in which the requested image resides to ensure: (1) that the requested image is actually in the associated photo album page; and (2) that the requestor has permission to access the photo album page and its contents, i.e., images.

One problem with routing images through the proxy server 36 is that it may require extra bandwidth. That is, the image must be moved twice; once from the peer server 24 to the proxy server 36, and then a second time from the proxy server 36 to the visiting computer 32. In addition, the path from a peer server 24 to the proxy server 26 generally has the longest latency because the peer server 24 is typically hosted in a user's home equipped with a cable modem or DSL that has an uplink speed much slower than the downlink speed. Thus, users may experience a significant delay when viewing images that are routed through the proxy server 36 due to the bandwidth limitations between a peer server 24 and the proxy server 36.

In addition, because peer servers 24 may be hosted in a variety of environments and host computers, there may be situations where the network to which a peer server 24 belongs may go off-line or the peer server 24 needs to go off-line for maintenance. It is also possible that a peer server 24 is a mobile system, such as a laptop or tablet PC, which goes in and out of network service. All of these issues would cause the peer server 24 to disconnect from the proxy server 26 and stop serving guest requests. In this situation, the requesting guest would fail to receive the requested content from the off-line peer server 24. There may be situations where a peer host computer needs to be off-line for a significant period of time (for example a laptop user), but the peer owner desires guests to be able to access shared images seamlessly.

SUMMARY OF THE INVENTION

In view of the above discussion, systems, methods, and computer program products for synchronizing digital photo albums at one or more peer servers with a proxy server and a guest content server in a photosharing peer-to-peer network are provided such that the proxy server and guest content server can serve content to requesters from photo albums of an off-line peer server. According to embodiments of the present invention, a synchronization manager receives a request from a peer server to synchronize image files of one or more photo albums at the peer server with image files cached on the proxy server. The request includes a URL for each photo album to be synchronized. The synchronization manager directs a web robot to crawl the URL of each photo album identified in the request and to identify image files at the peer server that have been modified and/or that are not currently cached on the proxy server. The web robot retrieves identified image files from the peer server and caches the retrieved image files on the proxy server. The web robot also identifies non-image files associated with each modified image file or with each image file not currently cached on the proxy server. The web robot retrieves the identified non-image files, stores the retrieved non-image files in a holding pen, and then caches the stored non-image files on the guest content server when all non-image files associated with a respective photo album have been stored.

DETAILED DESCRIPTION OF THE INVENTION

Figure 1:
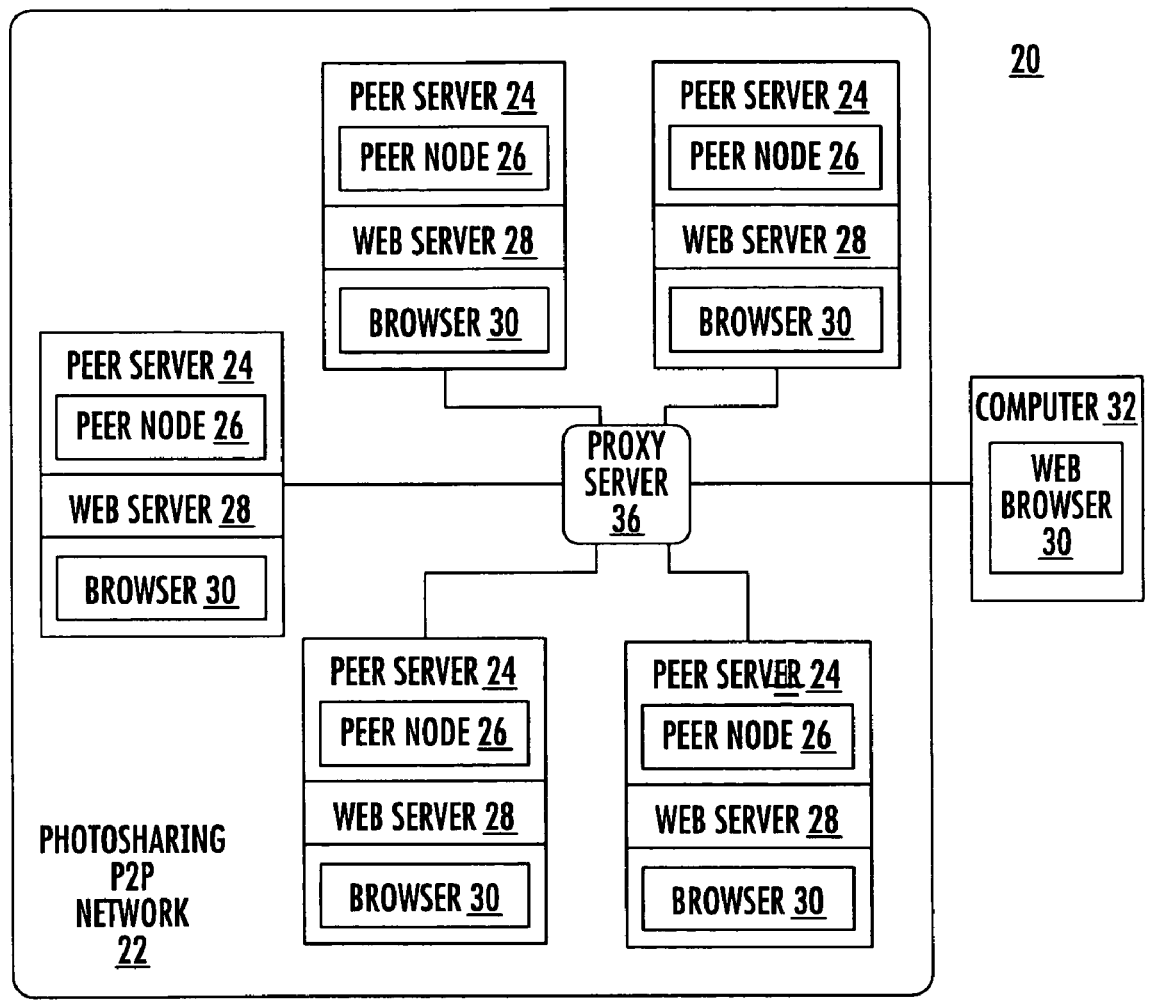
FIG. 1 is a block diagram that illustrates an example of a peer-to-peer photosharing network in which embodiments of the present invention may be implemented.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first peer device could be termed a second peer device, and, similarly, a second peer device could be termed a first peer device without departing from the teachings of the disclosure.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can store the program for use by or in connection with the instruction execution system, apparatus, or device.

The computer-usable or computer-readable medium may be, for example but not limited to, an electronic, magnetic, optical, electromagnetic or infrared device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

The present invention is described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computing device (such as a computer or other programmable data processing apparatus) to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a peer server, proxy server, and visiting computer may be any computing device including, but not limited to, PCs, workstations, mobile phones, and PDAs, with components necessary for executing the appropriate software. Also, in an embodiment of the present invention, the physical communications network is the Internet, although any type of network could be used.

As used herein, the terms "album", "photo album", and "web album" are interchangeable.

Figure 2:
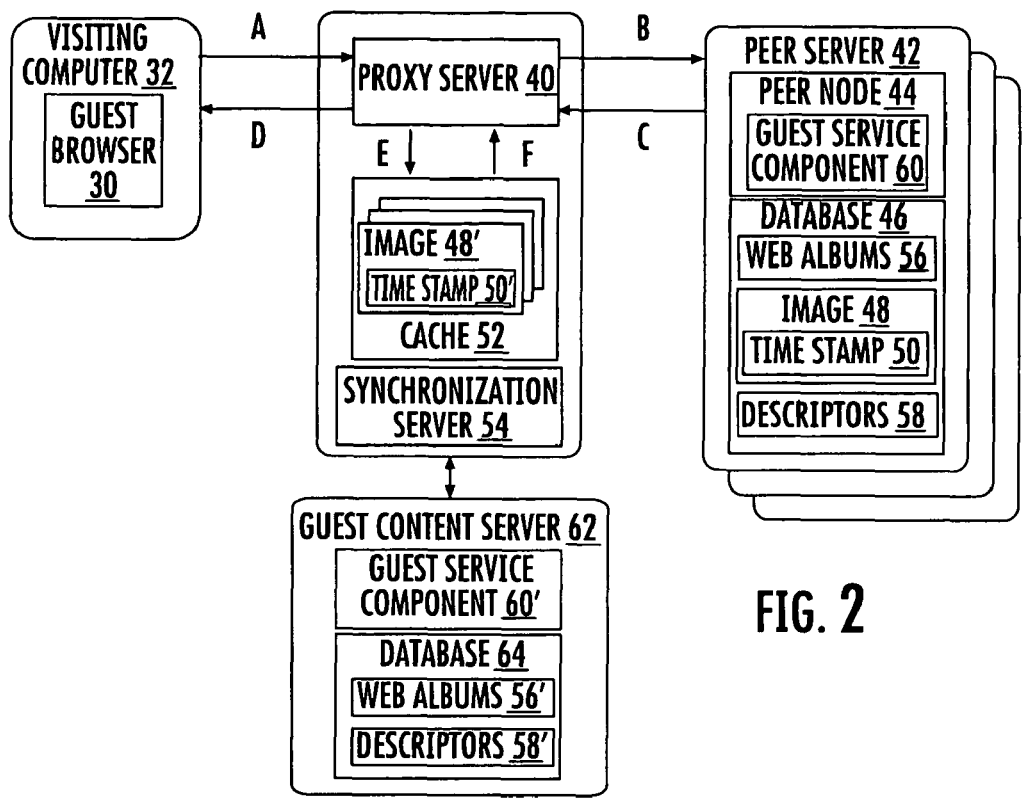
FIG. 2 is a block diagram of a photosharing network according to embodiments of the present invention.

FIG. 2 is a detailed block diagram of a photosharing network according to embodiments of the present invention. Besides the components shown in FIG. 1, each peer server 42 includes a peer node application 44, and a database 46 of web photo albums 56 and associated digital images 48. The peer node application 44 also includes a guest service component 60 used to fulfill guest requests to view content, such as web photo albums 56 from the peer server 42. The database 46 is typically stored on a hard drive of the hosting computer system, and the images 48 are typically given a timestamp 50 by the host operating system that indicates a date of creation or a modification date, as is well-known in the art.

Each web photo album 56 may include one or more web pages and is associated with a descriptor 58 that includes information about the state of the peer and the web pages comprising the web photo album. The descriptor 58 may include an identification of the peer server 42, the number and identity of the images 48 included in the web pages, access privileges for the photo album and for each image 48 therein, and any metadata that is not stored in the images 48. The access privileges may indicate whether the photo album 56 is private, public, or restricted. If the photo album 56 is "private," then only the owner is allowed to view the photo album; if the photo album 56 is "public," then everyone can access the photo album 56; and if the photo album 56 is "restricted," then the photo album 56 is accessible only to selected users. In this case, the descriptor 58 includes an access list. The descriptor 58 for each web photo album 56 is stored in the database 46 in the peer 42. In an alternative embodiment, the database 46 may maintain a descriptor 58 for each web page in the photo album 56.

The proxy server 40 acts as a proxy for the distributed peer servers 42, which have a pre-established connection to the proxy server 40. The proxy server 40 enables a firewall-protected peer server 42 to enable incoming generic HTTP access by establishing an outbound connection from the firewall-protected peer server 42 with the proxy server 40. Incoming Web traffic for the firewall-protected peer server 42 is then directed to the proxy server 40. The proxy server 40 multiplexes the Web traffic using a proprietary protocol to the peer server 42, thus enabling generic web traffic to flow to the peer server 42 despite the presence of a firewall (not shown). In the case where there are multiple firewall-protected peer servers 42, the proxy server 40 acts as a switchboard to receive and dispatch the incoming HTTP requests to the appropriate peer servers 42. A process for providing Web browsing through a firewall in a peer-to-peer network is described further in U.S. patent application Ser. No. 10/813, 839, which is incorporated herein by reference in its entirety.

According to embodiments of the present invention, images 48 stored on the peer server 42 that are requested for viewing by a visiting computer 32, are stored in a cache 52 on the proxy server 40 either before or after the first time the image is requested. In addition, the peer-to-peer photo sharing network is provided with a guest content server 62 that is coupled to both the proxy server 40 and the peer server 42. The guest content server 62 is provided with the same guest service component 60 on the peer server 42 so that the guest content server 62 can fulfill requests to view content on the peer server 42 when the peer server 42 is unavailable. Although the embodiment shown in FIG. 2 illustrates the proxy server 40 and the guest content server 62 as separate computers, the functionality of the proxy server 40 and the guest content server 62 may be implemented on the same computer.

Figure 3:
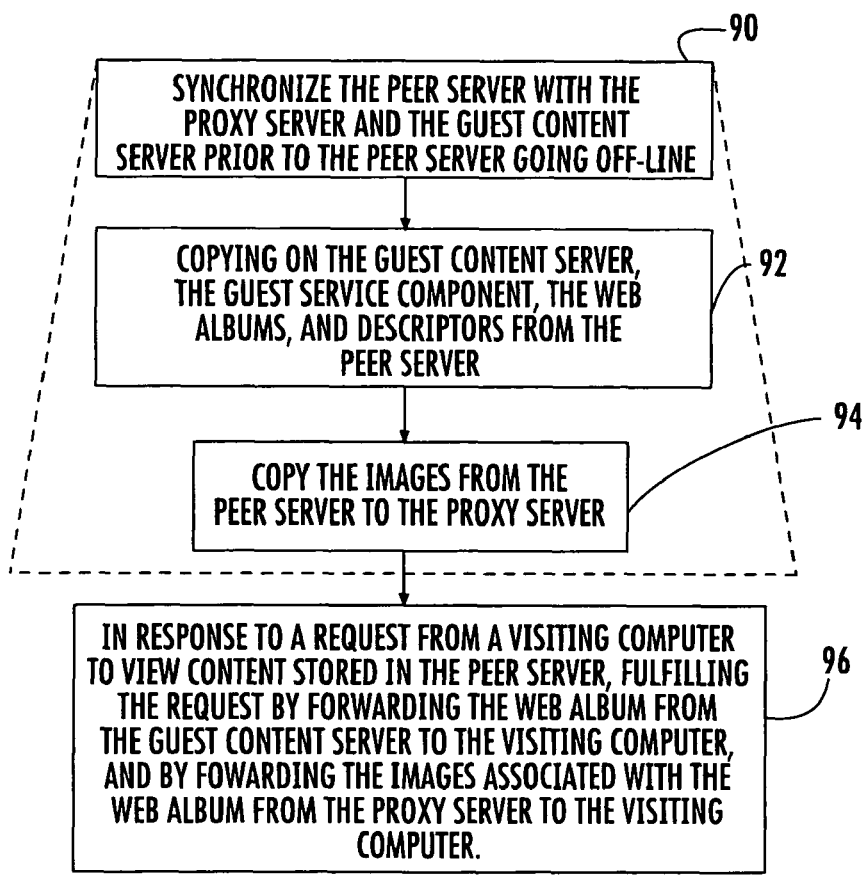
FIG. 3 is a flow diagram that illustrates delivering content from a peer server in a photosharing peer-to-peer network in accordance with embodiments of the present invention.

FIG. 3 is a flow diagram illustrating a process for providing content from a peer server in a photosharing peer-to-peer network in accordance with embodiments of the present invention. Referring to both FIGS. 2 and 3, the process begins in step 90 by synchronizing the peer server 42 with the proxy server 40 and the guest content server 62 prior to the peer server 42 going off-line. In step 92, the guest functionality of the peer server 42 is reproduced on the guest content server 62 by copying on the guest content server 62, the guest service component 60, the web photo albums 56, and descriptors 58 from the peer server 42. The guest content component 60' may only need to be loaded onto the guest content server 62 once (e.g., during initial configuration of the guest content server 62), while the web photo albums 56 and descriptors 58 are copied to the guest content server 62 and stored in the database 64 each time the synchronization process is performed. In step 94, the images 48 stored on the peer server 42 are copied to the proxy server 40 and stored in the cache 52.

In response to a request from a visiting computer 32 to view content stored in the peer server 42 via the proxy server 40, the request is fulfilled in step 96 by forwarding the web photo album 56' from the guest content server 62 to the visiting computer 32, and by forwarding the images 48' associated with the web photo album 56' from the proxy server 40 to the visiting computer 32, thereby successfully serving content from the peer server 42 even when the peer server 42 is off-line.

Figure 4:
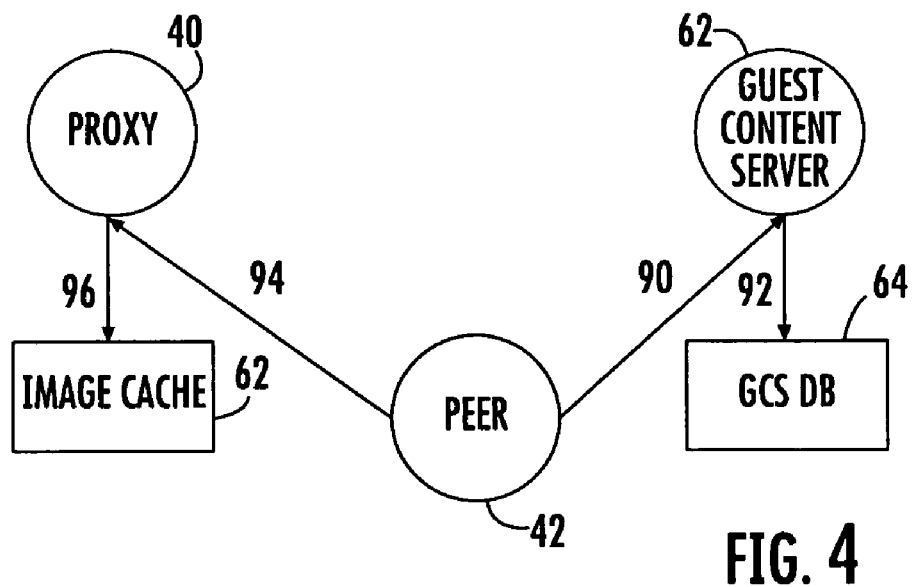
FIG. 4 is a flow diagram that illustrates a synchronization process between a peer server, proxy server, and guest content server, according to embodiments of the present invention.

FIG. 4 is a flow diagram illustrating a synchronization process between the peer server 42, the proxy server 40, and the guest content server 62 according to embodiments of the present invention. The illustrated synchronization process is initiated by the peer server 42 prior to the peer server 42 going off-line. The illustrated synchronization process begins in step 90 in which the peer server 42 uploads the peer state information to the guest content server 62, including the web photo album descriptors 58 and the web photo albums 56. In step 92 the guest content server 62 replicates the peer state in its database 64, resulting in the storage of web photo albums 56' and web photo album descriptors 58'. In step 94, the peer server 42 initiates synchronization with the proxy server 40 in which new and/or modified images 48 from the peer server 42 are copied to the proxy server 40. In step 96, the proxy server 40 saves the new and/or modified images 48 in the cache 52. This proxy caching process is described in further detail with respect to FIG. 6.

Figure 5:
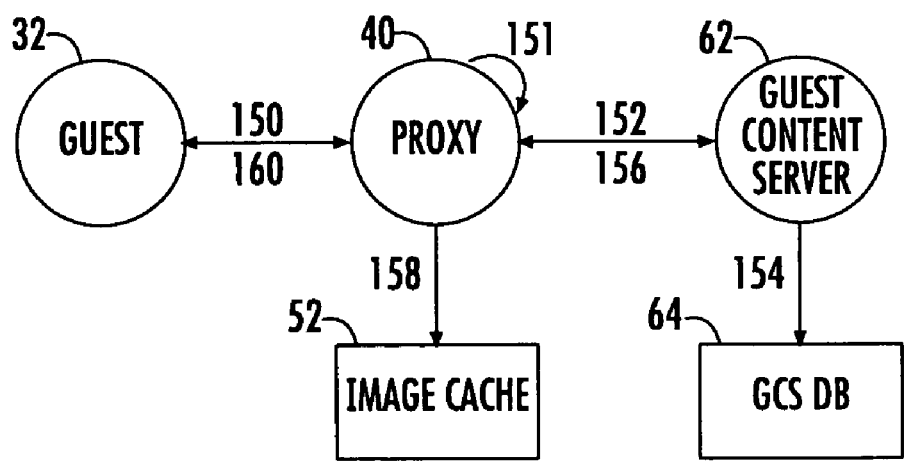
FIG. 5 is a flow diagram that illustrates serving content from a peer server when the peer server is off-line, according to embodiments of the present invention.

FIG. 5 is a flow diagram illustrating a process for serving content from a peer server 42 when the peer server 42 is off-line online. The illustrated process begins in step 150 when a visiting computer 32 or guest submits via a client, such as a browser 30, a request (URL) to view content on the peer server 42 via the proxy server 40 that the URL for the peer server 42 resolves to. In step 151, rather than automatically forwarding the request to the peer server 42, the proxy server 40 first determines if the peer server 42 is available or not, and whether the peer server 42 is also a subscriber to this off-line service. If the peer server 42 is online, then the proxy server 40 routes the request to the peer server 42 for normal fulfillment through the guest service component 60. If the peer server 42 is off-line, but is not an off-line subscriber, then the proxy server 40 will send the browser 30 of the visiting computer 32 a "peer off-line" message. If the peer server 42 is both off-line and an off-line subscriber, then in step 152 the proxy server 40 routes the request to the guest content server 62 using a proprietary protocol. A proprietary protocol is used to avoid HTTP which may result in a redirect and change the URL in the browser 32 to the URL of the guest content server 62.

In step 154, when the guest content server 62 receives the request to access a photo album 56 from the peer server 42, the guest service component 60' accesses the database 64 to retrieve the descriptor 58' associated with the requested photo album 56'. From the descriptor 58', the guest service component 60' determines whether the requestor (e.g., user of the visiting computer) is permitted to access the photo album 56' and which images 48' are in the web photo album pages. If the access is authorized, then the guest service component 60' retrieves from the database 64 captions, order information, and links to embedded images, and constructs the requested web photo album 56'. In step 156, the guest service component 60' returns to the proxy server 40 the constructed web photo album.

In step 158, the proxy server 40 receives the constructed web photo album and pulls out the specified images 48' from cache 52. In step 160 the proxy server 40 returns the web photo album 56' and images 40' to the requesting browser 30. In an alternative embodiment, the constructed web photo album is forwarded to the guest browser 30, and the guest browser 30 makes requests to the proxy server 40 for each of the images to be displayed in the web photo album.

According to other embodiments of the present embodiment, the proxy server 42 ensures that the images 48' in its cache 52 are fresh by sending a request to the peer server 42 to check whether a requested image 48' has been modified since being cached. This is accomplished by comparing the timestamp 50' of the cached image 48' with the timestamp 50 of the image 40 stored on the peer server 42. If the comparison of the timestamps indicates that the image 48 on the peer server 42 has been modified, then the peer server 42 transfers the modified image to the proxy server 42 prior to the proxy server 42 serving the image to the requester.

By caching the images 48' on the proxy server 40, embodiments of the present invention may significantly reduce the need to transfer images from a peer server 42 to the proxy server 40 to satisfy each image request. Although a small amount of data is transferred between the proxy server 40 and the peer server 42 in order to determine if the proxy's cache 52 is still fresh, this traffic is generally only a few bytes, as opposed to the kilobytes or megabytes required to transfer images 40 from the peer server 42 to the proxy server 40 for every image request.

Figure 6:
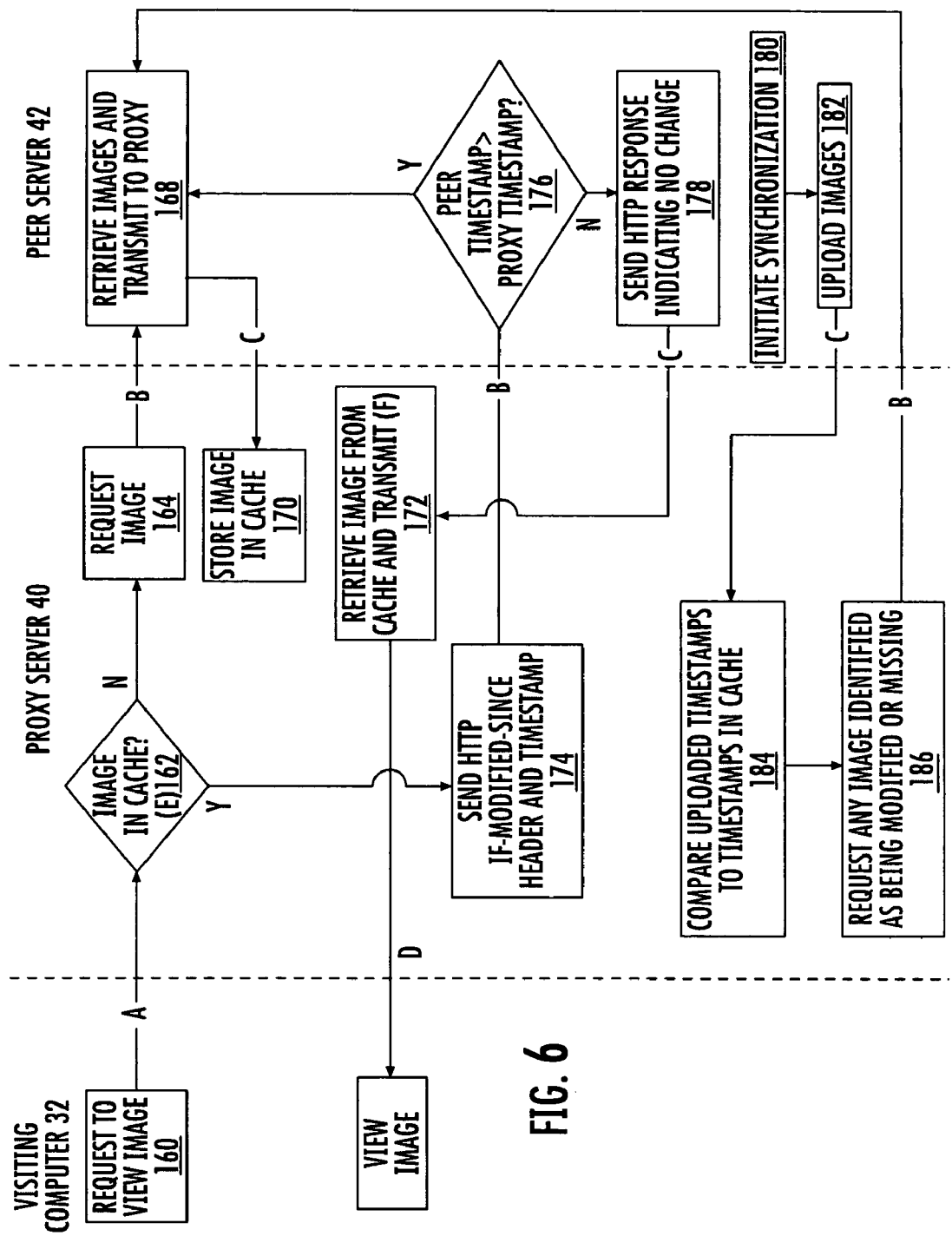
FIG. 6 is a flow diagram that illustrates serving content from a peer server, according to embodiments of the present invention.

FIG. 6 is a flow diagram illustrating a process for improving guest viewing performance of images stored on peer servers in a photosharing peer-to-peer network. Referring to both FIGS. 2 and 6, the process begins in step 160 when a visiting computer 32 issues a request to view an image 48 stored in the peer server 42. The request is routed to the proxy server 40 via path (A). In step 162 the proxy server 40 checks if a copy of the image 48' is stored in the cache 52 via path (E, FIG. 2). If the copy of the image 48' is not stored in the cache (a cache miss), which may occur the first time an image is requested, then in step 164 the proxy server 40 sends a request for the image to the peer server 42 hosting the requested image 48 via path (B).

In step 168, the peer server 42 retrieves the image 48 and transmits a copy of the image 48 to the proxy server 40 via path (C). In step 170, the copy of the image 48' is stored in the cache 52. In step 172, the proxy server 40 retrieves the cached image 48' via path (F), and serves it to the requesting visiting computer 32 via path (D). According to embodiments of the present invention, the proxy server 40 streams the image 48' to the visiting computer 32 while the image 48' is being downloaded from the peer server 42 to further reduce the latency between the time that the request is made and the image is returned.

Referring again to step 162, if the image 48' is present in the cache 52 (a cache hit), the proxy server 40 determines if the cached image 48' is still fresh in step 174 by sending a request to the peer server 42 in the form of a standard HTTP "If-Modified-Since" header with the timestamp 50' of the cached image 48' via path (B). In step 176, the peer node application 44 on the peer server 42 compares the timestamp 50' of the cached image 48' with the timestamp 50 of the image 40 stored on the peer server 42. If the timestamp 50 of the image 48 stored on the peer server 42 is different (i.e., newer) than the timestamp 50' of the cached image 48', then the peer server 42 determines that the image 48 on the peer server 42 has been modified since the image was cached (stale cache). In step 168, the peer server 42 returns a copy of the image 48 as a response via path (C).

If the peer server 42 determines that the image 48 it has stored locally does not have a newer timestamp 50 than the timestamp 50' sent by the proxy server 40 in step 176, then in step 178, the peer server 42 sends a 304 HTTP return code to the proxy server 40 as a response indicating that the image has not been modified via path (C). The proxy server 40 then retrieves the image 48' from the cache 52 via path (F) and serves it to the visiting computer 32 via step 172 via path (D).

From time to time, the peer server 42 will become disconnected from the proxy server 40, especially in home environments where users often shut down their PCs when not in use. In this case, the proxy server 40 cannot communicate to the peer server 42 to determine if the images 48' in the cache 52 are still valid. Therefore, the proxy server 40 needs an updated set of the most current images and web page components surrounding those images before the peer server 42 goes off-line.

According to embodiments of the present invention, this may be handled via a synchronization server 54 (FIG. 2) and a synchronization protocol. Referring to both FIGS. 2 and 6, in operation, the user may initiate the synchronization protocol between the peer server 42 and the synchronization server 54 in step 180 prior to disconnecting the peer server 42. In a preferred embodiment, the user interface of the peer node 44 displays a peer synchronization icon or menu item that the user may select. Alternatively, the user may be prompted to perform synchronization, which the user may choose to accept or decline.

Once synchronization is invoked, in step 182 the peer server 42 uploads the timestamps 50 of all the images 48 to the synchronization server 54 via path (C). In step 184, the synchronization server 54 compares the uploaded timestamps 50 to the timestamps 50' to determine if the cached images 48' are current and whether there are any missing images in the cache 52. In step 186, the synchronization server 54 sends a request to the peer server 42 for any images identified as being modified or missing. In step 168, the peer server 42 retrieves and transmits the requested images 48 to the proxy server 40 via path (C).

According to embodiments of the present invention, synchronization may be performed upon request by the user. Alternatively, synchronization may be performed automatically in the background, or in the background according to a schedule. That is, the proxy server 40 may be synchronized with a peer server 42 at the same time the proxy server 40 is serving images to the visiting computer 32. In this embodiment, synchronization may be performed when the peer server 42 first makes a connection to the proxy server 40. Background synchronization may also be performed when it is detected that a peer server's connection is idle. In either form of background synchronization, by the time the user shuts down a peer server 42 after an active session, synchronization with the proxy server 44 may be more than likely complete.

According to embodiments of the present invention, the synchronization server 54 is a component of the proxy server 40. However, the synchronization server 54 may be separate from the proxy server 40 and may run on a separate computer.

As can be seen, an image is only transferred from the peer server 42 to the proxy server 40 via path (C) when it is not present in the cache 52, which is typically the case the very first time the image is request, and when the image in the cache 52 needs to be updated. However, other than the first time the image is requested, the image will be present in the cache 52, and the only data passed between the peer server 42 to the proxy server 40 via path (C) is the HTTP return code, which is only a few bytes, rather than megabytes to transfer the image. Due to this decrease in traffic between the peer server 42 and the proxy server 40, image viewing performance of the P2P network for guests may be significantly increased.

Figure 7:
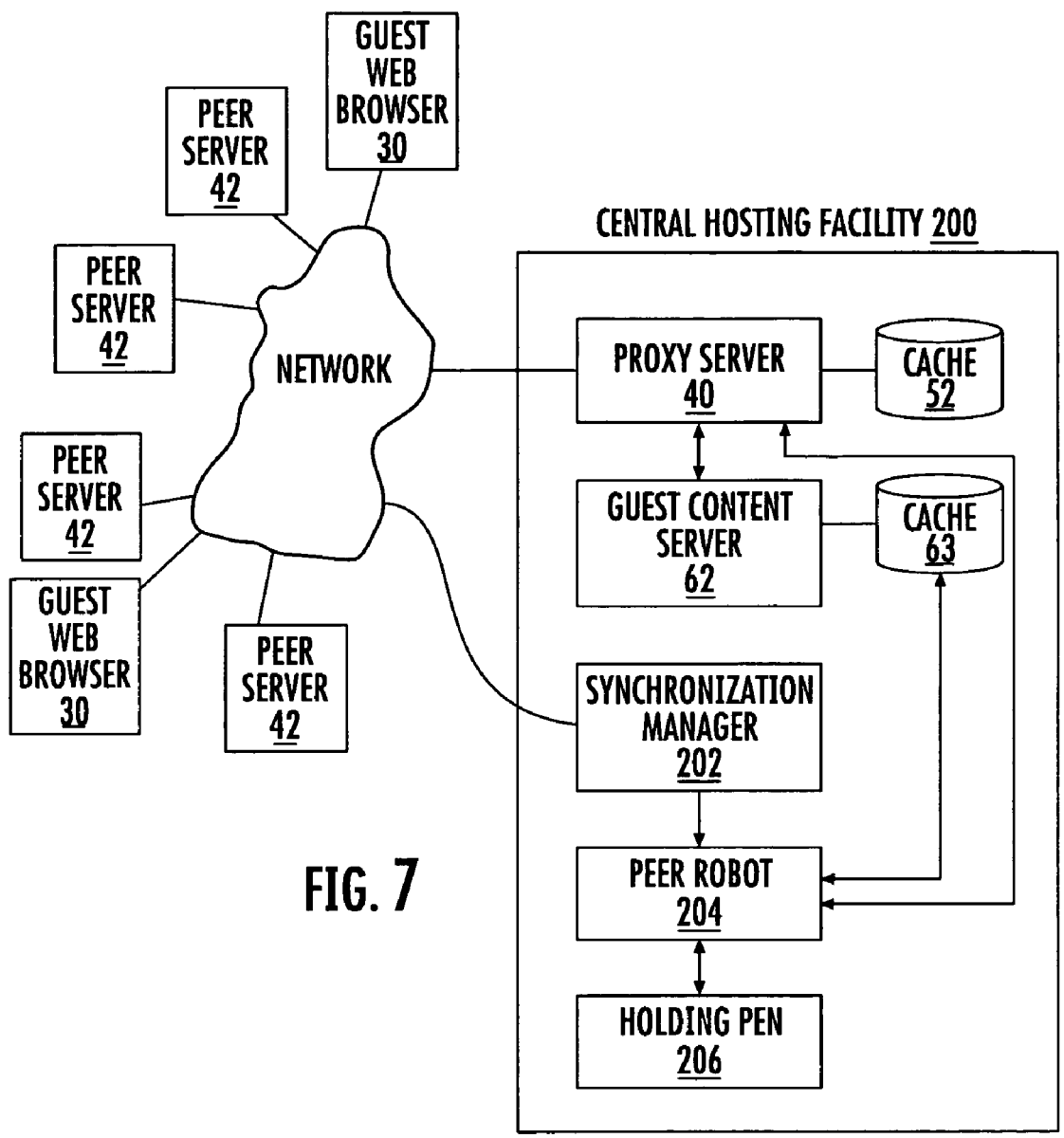
FIG. 7 is a block diagram of a central hosting facility that facilitates synchronization of peer server content with a proxy server and guest content server, according to embodiments of the present invention.

Referring to FIG. 7, a central hosting facility 200 that facilitates synchronization of peer server content with a proxy server and guest content server, according to embodiments of the present invention, is illustrated. The illustrated central hosting facility 200 includes a proxy server 40 and guest content server 62 that function as described above with respect to FIGS. 2-6. The proxy server 40 and guest content server 62 each have respective caches 52,63 associated therewith. The central hosting facility 200 also includes a synchronization manager 202, a peer robot 204, and a holding pen 206. The synchronization manager 202 manages requests from peer servers 42 to synchronize photo albums located at the peer servers 42. The peer robot 204 crawls a peer server, for example using standard HTTP, in order to synchronize the proxy server cache 52 and the guest content server cache 63. The synchronization manager 202, peer robot 204, and holding pen 206 function together as described below to keep content from peer servers 42 as current as possible in the proxy server cache 52 and guest content server cache 63 so that guest web browsers 30 can seamlessly view peer server content whether a peer server is off-line or on-line.

The proxy server cache 52 is configured to store images from a peer server photo album, as described above. The guest content server cache 63 is configured to store non-image files (e.g., text files, HTML files, XML files, configuration files and binary files, etc.). These non-image files may include such items as image permission information, image captions, display orders, web pages that display one or more images, etc. The guest content server may also contain a portion of the peer server logic. The holding pen 206 is configured to store non-image content prior to delivery to the guest content server cache 63.

Figure 8:
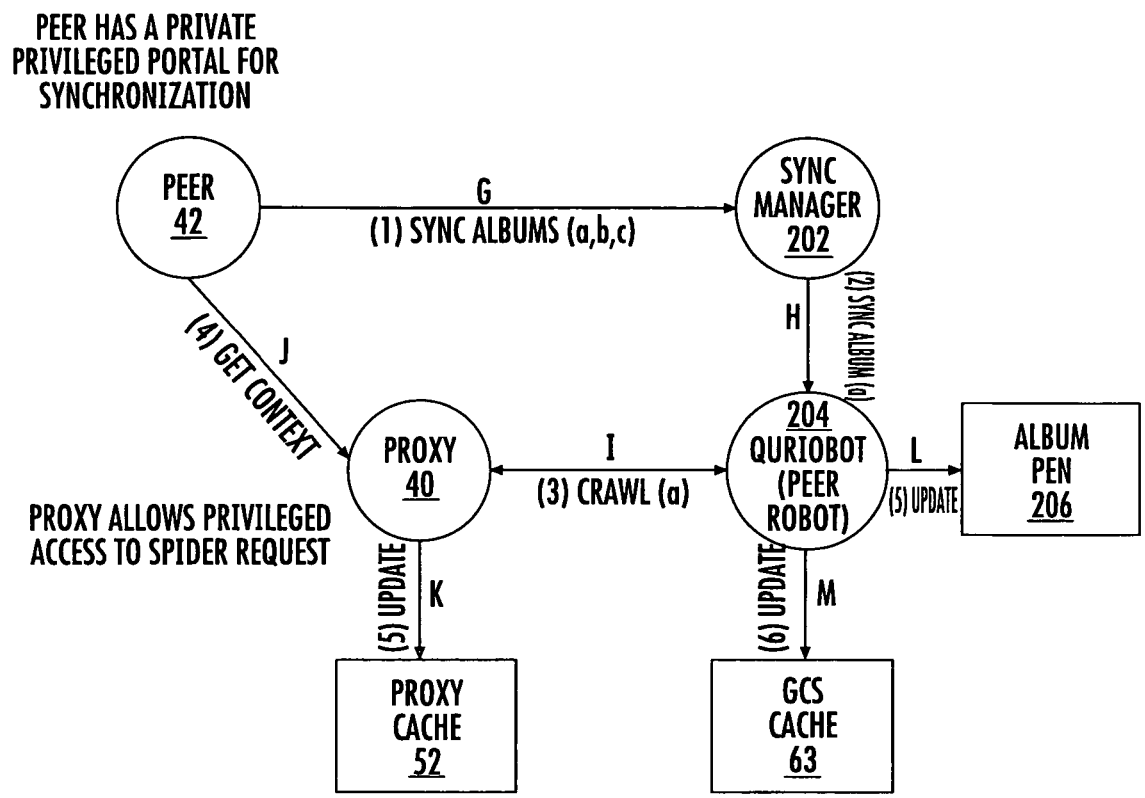
FIG. 8 is a block diagram that illustrates synchronization of peer server content via the central hosting facility of FIG. 7, according to embodiments of the present invention.

Referring to FIG. 8, synchronization of peer server content via the central hosting facility 200 of FIG. 7 is illustrated. Synchronization may be initiated by a peer server 42 automatically, according to a schedule, or by a peer server user/owner. Regardless as to how synchronization is initiated, a peer server 42 determines which photo albums need to synchronized. Each peer server 42 sets a "dirty flag" on each photo album that contains new or updated content which has not been synchronized since the last successful synchronization session. The term "dirty flag" is a term of art well understood by those skilled in the art of the present invention. Accordingly, each peer server 42 examines its photo albums for dirty flags and sends a synchronization request via, for example, HTTP to the synchronization manager 202 upon identifying one or more dirty flags. The HTTP message contains the name of the peer server and the URL of the one or more photo albums to be synchronized (G).

Upon receiving notification from a peer server 42 that the peer server 42 contains one or more photo albums that require synchronization, the synchronization manager 202 communicates with the peer robot 204 and directs the peer robot 204 to the URL of each photo album to be synchronized, for example, sequentially in the order passed by the peer server 42 (H). The peer robot 204 connects to the peer server 42 via the proxy server 40 and a privileged portal for synchronizing photo album content (i.e., images and database files) and "walks" or "crawls" each photo album similar to how a web crawler visits internet sites and gathers information (I). The proxy server 40 is configured to recognize the peer robot 204 and to allow privileged access to the peer server synchronization portal.

The proxy server 40 is configured to provide only the peer robot 204 access to the privileged peer robot portal. According to embodiments of the present invention, the proxy server 40 accomplishes this via IP filtering and token mechanisms as described in co-assigned U.S. patent application Ser. No. 10/942,578, which is incorporated herein by reference in its entirety.

The proxy server 40 is configured to determine when the requestor for an image in a peer server photo album is the peer robot 204, and will not return the image to the peer robot 204. The proxy server 40 will only update its cache 52 with images. The proxy server 40 updates its cache 52 directly as a result of a request from the peer robot 204, and does not need to return the image.

The terms "walk" and "crawl", as used herein, mean that the peer robot 204 visits a peer server 42 and gathers information about one or more identified photo albums requiring synchronization. As it walks a peer server 42, the peer robot 204 requests images and database files associated with respective photo albums requiring synchronization (J). The process of walking the images and requesting them automatically updates the proxy server cache 52 (K). The peer robot 204 stores the guest content server database files in the holding pen 206 until an entire album is synchronized (L). According to embodiments of the present invention, the peer robot 204 uses standard HTTP and recognizes and uses the "If-not-modified-since" header in order to only upload files that have changed. Once a photo album is successfully synchronized, the synchronization manager 202 moves the content from the holding pen 206 to the guest content server cache 63 (M), and starts synchronizing another album.

The peer robot 204 is configured to behave like a standard HTTP web robot (spider) with the following exceptions. The peer robot 204 does not expect an image from a peer server photo album to be returned, and the source and destination of peer server database cache files are different. That is, when getting the time stamp to send to a peer server in order to determine if the peer server database file is out of date, the peer robot 204 obtains the time stamp from the guest content server cache 63. When a peer server database file has changed and it needs to be uploaded, the peer robot 204 stores the files in the holding pen 206 until all the peer server database files for a particular photo album are uploaded, at which point the files are moved to the guest content server cache 63.

According to embodiments of the present invention, synchronization is photo album centric. That is, a peer server synchronizes one photo album at a time. Each photo album is a transactional unit. If a photo album fails to synchronize completely, it does not get moved to the appropriate cache.

Figure 9:
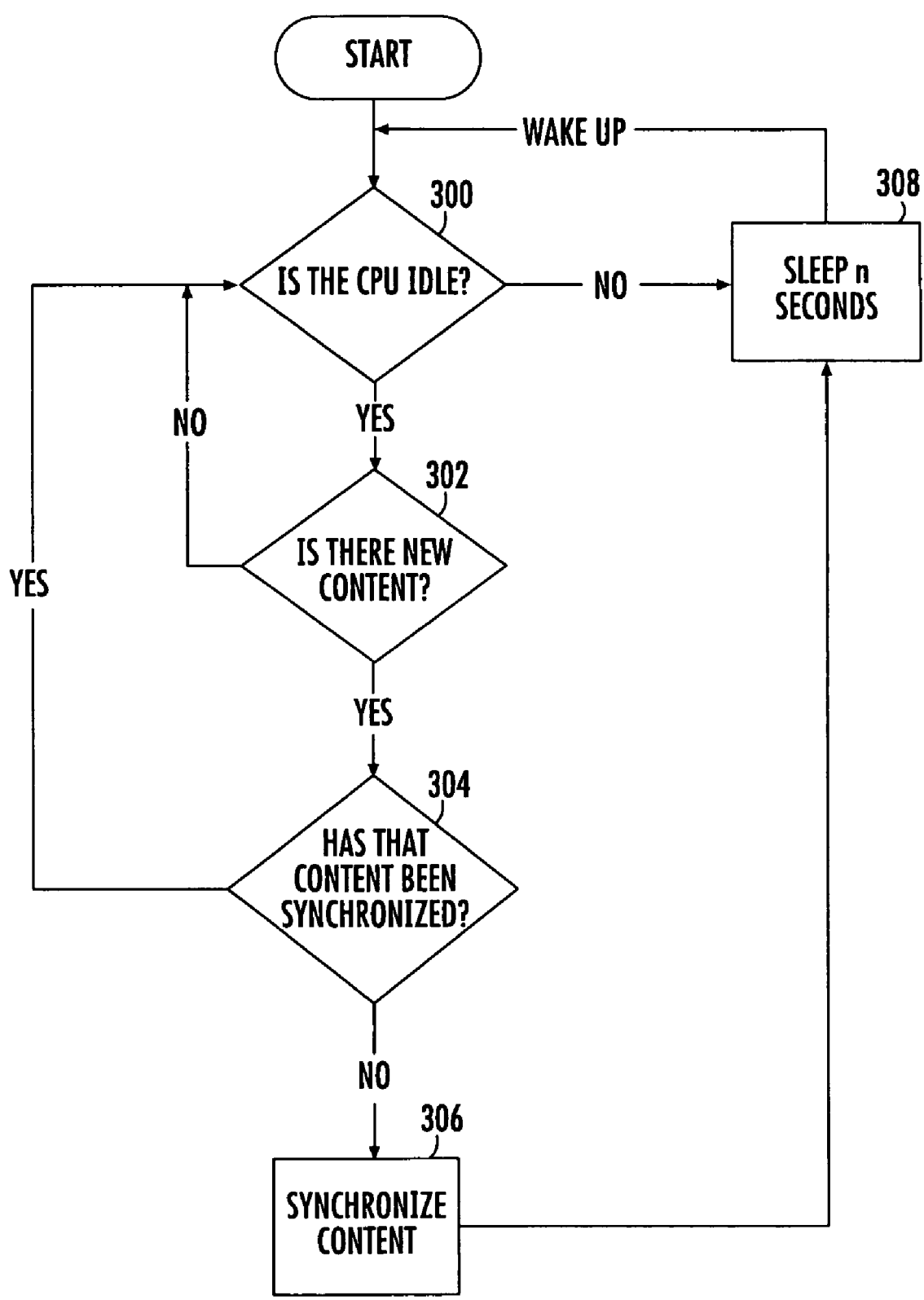
FIG. 9 is a flow diagram that illustrates operations for implementing automatic synchronization, according to embodiments of the present invention.

As discussed above, synchronization may be initiated by a peer server 42 automatically, according to a schedule, or by a peer server user/owner. Automatic background synchronization is initiated by a peer server when both of the following conditions are true: (1) there is a new or modified unsynchronized photo album; and (2) the peer server is idle (e.g., if the peer server CPU utilization is lower than 95% for at least about 5 minutes; however, other time and CPU parameters may be selected without limitation). FIG. 9 illustrates operations for implementing automatic synchronization, according to embodiments of the present invention. A determination is made whether a peer server CPU is idle (Block 300). If the answer is yes, a determination is made whether there is new or modified peer server content (Block 302). If the peer server CPU is not idle, the procedure waits or "sleeps" for a predetermined period of time before checking the CPU status again (Block 308). If no new or modified content exists, operations revert to Block 300 and a determination is again made as to whether the CPU is idle or not. If content is new or has been modified, a determination is made whether the new/modified content has been synchronized as described above (Block 304). If the answer is no, the content is synchronized (Block 306) and then the procedure waits or "sleeps" for a predetermined period of time before checking the CPU status again (Block 308). If the answer is yes, operations revert to Block 300 and a determination is again made as to whether the CPU is idle or not.

Peer server owner-initiated synchronization may function like automatic background synchronization, except that it cannot be interrupted (except by user action). According to embodiments of the present invention, a peer server owner may select which photo albums he/she wants to synchronize and initiates the synchronization process. Scheduled synchronization is initiated by a peer server at a certain configurable time (e.g., 3:00 AM). If there are photo albums with a dirty flag set, a peer server communicates with the synchronization manager 202 to synchronize those photo albums having dirty flags, as described above.

According to embodiments of the present invention, automatic background synchronization may behave as a background low-priority process and can be interrupted if a peer server detects that the CPU is no longer idle, or if a peer server owner issues an explicit stop command. According to embodiments of the present invention, scheduled or peer server owner initiated synchronization can only be stopped by a peer server owner issuing an explicit halt command. According to embodiments of the present invention, synchronization is typically not interrupted due to guest traffic to a peer server.

According to embodiments of the present invention, if for any reason synchronization is halted, the synchronization process starts all over again, with a peer server 42 initializing the process. Images that were synchronized in the proxy server cache 52 prior to synchronization interruption will have their timestamps rechecked, but will not need to be re-synchronized. Peer server database cache files stored in the holding pen 206 will be treated as "transaction roll back" when synchronization is interrupted, and thus will need to build the transaction from the beginning. If a peer server fails to respond after a predetermined number of re-tries and timeout interval, the synchronization manager 202 assumes that the synchronization session has failed and ends the session.

Figure 10:
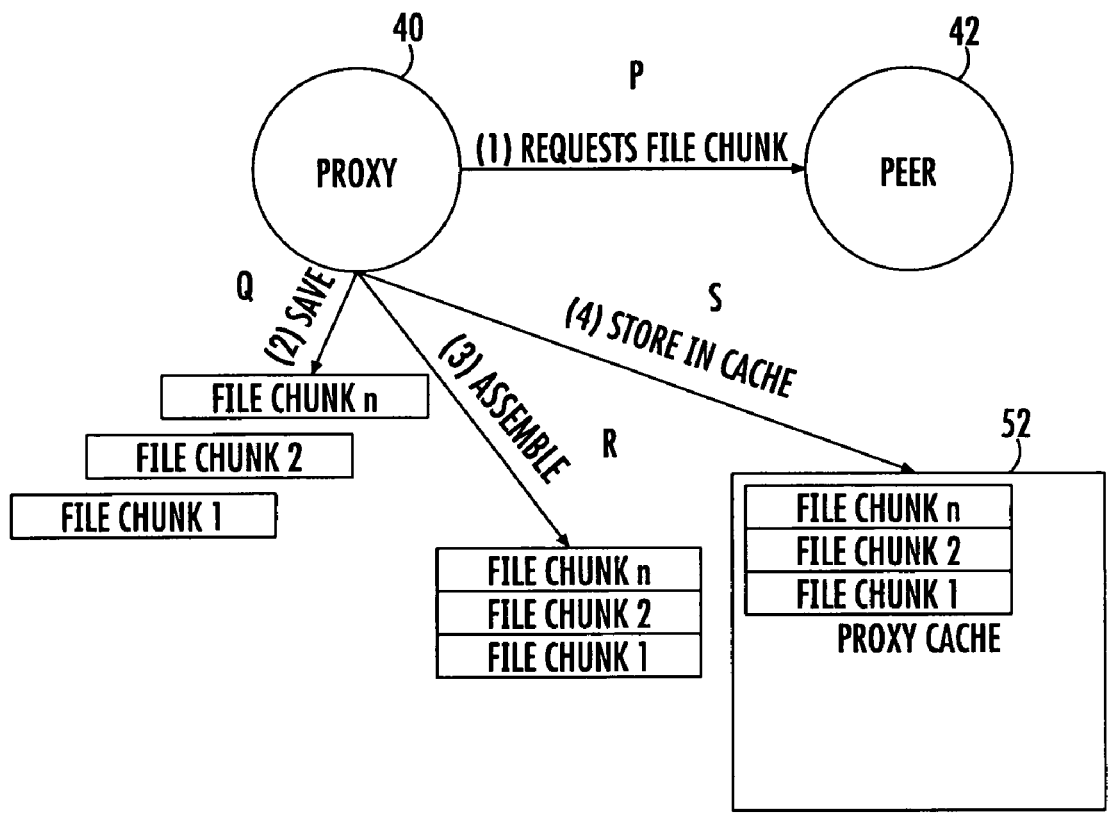
FIG. 10 is a block diagram that illustrates a proxy server requesting file chunks from a peer server, saving the file chunks, assembling the file chunks, and then caching the assembled file chunks in the proxy server, according to embodiments of the present invention.

According to embodiments of the present invention, the proxy server 40 is configured to support large file chunking after synchronization interruption, in order to conserve real time, bandwidth and CPU time. The proxy server 40 store chunks of files as they are uploaded, and then assembles them when the last file chunk is uploaded. Thus, where synchronization is interrupted and then re-started, existing file chunks do not have to be re-uploaded. The proxy server just picks up where it left off. FIG. 10 illustrates a proxy server 40 requesting file chunks from a peer server (P), saving the file chunks (Q), assembling the file chunks (R), and then storing the assembled file chunks in the proxy server cache 52 (S).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. A method of synchronizing a digital photo album at a peer server with a proxy server in a photosharing peer-to-peer network, wherein the proxy server is configured to serve content from the photo album at the peer server when the peer server is offline, the method comprising:
receiving a request from a peer server to synchronize image files of a photo album at the peer server with image files cached on the proxy server, wherein the request includes a URL for the photo album;
directing a web robot to crawl the URL of the photo album, wherein the web robot is configured to identify image files at the peer server that are not cached on the proxy server, and to request the identified image files from the peer server via the proxy server;
in response to the request, receiving, at the proxy server, the identified image files from the peer server;
determining, by the proxy server, that the request was initiated by the web robot and wherein in response to the determination the proxy server does not provide the identified image files requested by the web robot to the web robot; and
caching the identified image files on the proxy server.

2. The method of claim 1, wherein the web robot is also configured to identify on the peer server non-image files associated with respective identified image files, and further comprising:

receiving, at the proxy server, the identified non-image files;

providing, by the proxy server, the identified non-image files to the web robot;

storing, by the web robot, the identified non-image files in a holding pen; and caching the stored non-image files on a guest content server only if all non-image files associated with the photo album have been stored in the holding pen.

3. The method of claim 1, wherein the web robot is configured to identify an image file at the peer server that has been modified by comparing a time stamp associated with the image file at the peer server with a time stamp associated with a corresponding image file cached on the proxy server.

4. The method of claim 2, wherein non-image files comprise files selected from the group consisting of text files, HTML files, XML files, configuration files and binary files.

5. The method of claim 1, wherein the peer server requests synchronization automatically as a result of additions or modifications to the photo album at the peer server.

6. The method of claim 1, wherein the peer server requests synchronization automatically as a result of additions or modifications to the photo album at the peer server and if peer server CPU utilization is lower than a predetermined amount for a predetermined period of time.

7. The method of claim 1, wherein the peer server requests synchronization automatically according to a predetermined schedule.

8. The method of claim 1, wherein the peer server requests synchronization as a result of user initiation at the peer server.

9. A system for synchronizing a digital photo album at a peer server with a proxy server in a photosharing peer-to-peer network, wherein the proxy server is configured to serve content from the photo album at the peer server when the peer server is offline, comprising:

a synchronization manager comprising:

a network interface adapted to communicate with a network; and a processor coupled to the network interface and adapted to:

receive a request from the peer server to synchronize image files of the photo album at the peer server with image files cached on the proxy server, wherein the request includes a URL for the photo album;

direct a web robot to crawl the URL of the photo album, wherein the web robot is configured to identify image files at the peer server that are not cached on the proxy server, and to request the identified image files from the peer server via the proxy server; and the proxy server comprising:

a network interface adapted to communicate with a network; and a processor coupled to the network interface and adapted to:

in response to the request, receive the identified image files from the peer server;

determine that the request was initiated by the web robot and wherein in response to the determination the proxy server does not provide the identified image files requested by the web robot to the web robot; and cache the identified image files on the proxy server.

10. The system of claim 9, wherein the web robot is also configured to identify non-image files associated with each modified image file or with each image file not currently cached on the proxy server and to request the identified non-image files from the peer server via the proxy server, and wherein the processor of the proxy server is further adapted to:

receive the identified non-image files;

provide the identified non-image files to the web robot; and wherein the web robot is further configured to store the identified non-image files in a holding pen, and to store the identified non-image files on a guest content server when all non-image files associated with the photo album have been stored in the holding pen.

11. The system of claim 9, wherein the web robot is configured to identify an image file at the peer server that has been modified by comparing a time stamp associated with the image file at the peer server with a time stamp associated with a corresponding image file cached on the proxy server.

12. The system of claim 10, wherein non-image files comprise files selected from the group consisting of text files, HTML files, XML files, configuration files and binary files.

13. The system of claim 9, wherein the peer server requests synchronization automatically as a result of additions or modifications to the photo album at the peer server.

14. The system of claim 9, wherein the peer server requests synchronization automatically as a result of additions or modifications to the photo album at the peer server and if peer server CPU utilization is lower than a predetermined amount for a predetermined period of time.

15. The system of claim 9, wherein the peer server requests synchronization automatically according to a predetermined schedule.

16. The system of claim 9, wherein the peer server requests synchronization as a result of user initiation at the peer server.

17. A non-transitory computer-readable medium comprising computer readable program code for synchronizing a digital photo album at a peer server with a proxy server in a photosharing peer-to-peer network, wherein the proxy server is configured to serve content from the photo album at the peer server when the peer server is offline, the computer readable program code comprising:

computer readable program code that receives a request from the peer server to synchronize image files of the photo album at the peer server with image files cached on the proxy server, wherein the request includes a URL for the photo album;

computer readable program code that directs a web robot to crawl the URL of the photo album, wherein the web robot is configured to identify image files at the peer server that are not cached on the proxy server, and to request the identified image files from the peer server via the proxy server;

computer readable program code that, in response to the request, receives, at the proxy server, the identified image files from the peer server, wherein the proxy server does not provide the identified image files to the web robot; and computer readable program code that caches the identified image files on the proxy server.

18. The computer-readable medium of claim 17, wherein the web robot is also configured to identify non-image files associated with each image file not currently cached on the proxy server and to request the identified non-image files from the peer server via the proxy server, and further comprising:

computer readable program code that receives, at the proxy server, the identified non-image files;

computer readable program code that provides, by the proxy server, the identified non-image files to the web robot;

computer readable program code that stores, by the web robot, the identified non-image files in a holding pen; and computer readable program code that caches the stored non-image files on a guest content server when all non-image files associated with the photo album have been stored in the holding pen.

19. The computer-readable medium of claim 17, wherein the web robot is configured to identify an image file at the peer server that has been modified by comparing a time stamp associated with the image file at the peer server with a time stamp associated with a corresponding image file cached on the proxy server.

20. The computer-readable medium of claim 18, wherein non-image files comprise files selected from the group consisting of text files, HTML files, XML files, configuration files and binary files.

21. The computer-readable medium of claim 17, wherein the peer server requests synchronization automatically as a result of additions or modifications to the photo album at the peer server.

22. The computer-readable medium of claim 17, wherein the peer server requests synchronization automatically as a result of additions or modifications to the photo album at the peer server and if peer server CPU utilization is lower than a predetermined amount for a predetermined period of time.

23. The computer-readable medium of claim 17, wherein the peer server requests synchronization automatically according to a predetermined schedule.

24. The computer-readable medium of claim 17, wherein the peer server requests synchronization as a result of user initiation at the peer server.

* * * * *